(12) United States Patent
Stechschulte

(10) Patent No.: US 9,113,510 B2
(45) Date of Patent: Aug. 18, 2015

(54) DIMMER FOR SPORT SIMULATION ENVIRONMENT

(71) Applicant: I/P Solutions, Inc., Perrysburg, OH (US)

(72) Inventor: Theodore J. Stechschulte, Maumee, OH (US)

(73) Assignee: I/P Solutions, Inc., Perrysburg, OH (US)

( * ) Notice: Subject to any disclaimer, the term of this patent is extended or adjusted under 35 U.S.C. 154(b) by 0 days.

(21) Appl. No.: 14/507,868

(22) Filed: Oct. 7, 2014

(65) Prior Publication Data

US 2015/0102741 A1  Apr. 16, 2015

Related U.S. Application Data

(60) Provisional application No. 61/890,470, filed on Oct. 14, 2013.

(51) Int. Cl.
*H05B 37/02* (2006.01)
*F21V 33/00* (2006.01)

(52) U.S. Cl.
CPC .............. *H05B 37/02* (2013.01); *F21V 33/008* (2013.01)

(58) Field of Classification Search
CPC ............. H05B 37/029; H05B 37/0281; H05B 33/0815; A63B 69/00; A63B 69/36; A63B 69/3623; A63F 13/00
USPC ......... 315/291, 292, 294, 297, 312, 316–318, 315/360; 473/199, 266, 131, 134, 136
See application file for complete search history.

(56) References Cited

U.S. PATENT DOCUMENTS

| | | | |
|---|---|---|---|
| 4,150,825 A | 4/1979 | Wilson | |
| 4,823,069 A | 4/1989 | Callahan et al. | |
| 5,277,426 A * | 1/1994 | Gerpheide et al. | 473/199 |
| 5,406,173 A | 4/1995 | Mix et al. | |
| 5,768,151 A * | 6/1998 | Lowy et al. | 463/2 |
| 5,846,139 A * | 12/1998 | Bair et al. | 473/156 |
| 6,577,080 B2 * | 6/2003 | Lys et al. | 315/362 |
| 6,887,162 B2 * | 5/2005 | Lindsay | 473/151 |

(Continued)

FOREIGN PATENT DOCUMENTS

WO   2010141200 A1   12/2010

OTHER PUBLICATIONS

International Search Report and Written Opinion for PCT/US14/59599, Oct. 8, 2014.

*Primary Examiner* — Haissa Philogene
(74) *Attorney, Agent, or Firm* — Marshall & Melhorn. LLC

(57) ABSTRACT

A light adjusting system for use with sport simulation equipment and a method of adjusting a state of operation of at least one light source used with golf simulation equipment is provided. The light adjusting system comprises a data interface, a light controller, an operations processor, and a storage device. The data interface is in communication with the sport simulation equipment. The light controller is in communication with at least one light source. The operations processor is in communication with the data interface and the light controller. The storage device is in data communication with the operations processor. The storage device includes at least one lighting profile. In response to communication between the sport simulation equipment and the data interface, the operations processor accesses the at least one lighting profile on the storage device and adjusts a state of operation of the at least one light source using the light controller.

23 Claims, 1 Drawing Sheet

(56) References Cited

U.S. PATENT DOCUMENTS

| | | |
|---|---|---|
| 8,368,647 B2 | 2/2013 | Lin |
| 8,409,024 B2 | 4/2013 | Marty et al. |
| 8,436,811 B2 | 5/2013 | Lin |
| 8,536,794 B2 | 9/2013 | Melanson et al. |
| 2003/0057884 A1* | 3/2003 | Dowling et al. .............. 315/291 |
| 2004/0198524 A1 | 10/2004 | Kwon |
| 2006/0001387 A1 | 1/2006 | Chansky et al. |
| 2008/0238931 A1 | 10/2008 | Komiya et al. |
| 2012/0242237 A1 | 9/2012 | Chen et al. |

* cited by examiner

DIMMER FOR SPORT SIMULATION ENVIRONMENT

RELATED APPLICATION

The present application claims the benefit of U.S. Provisional Application No. 61/890,470 filed on Oct. 14, 2013, which is incorporated herein in its entirety by reference.

FIELD OF THE INVENTION

The invention relates to lighting systems and, more particularly, to a system for adjusting a lighting setting used with sport simulation equipment.

BACKGROUND OF THE INVENTION

Simulation environments for a variety of sports are well-known and are typically used to provide a training experience which can provide a user with information typically not available to the user during conventional participation in the sport. For example, a golf simulation environment may be used to simulate hitting golf balls without requiring a large area conventional participation in the sport requires. Such simulations provide information which allows the user to refine a technique used in the sport, with a goal of improving a performance of the user during conventional participation in the sport. The simulation environment may include a ball tracking device for detecting a position of, for example, a golf ball, and a processor for receiving a signal from a sensor. The processor analyzes the signal from the sensor and generates an image signal in response to the analysis of the signal from the sensor, wherein the analyzing of the signal from the sensor includes determining a relationship of a golf ball hit by the user in relation to a simulated terrain, a golf course, or a practice range.

Simulation environments also afford the opportunity to record the techniques of the user. Recording may be performed by one or more of a number of types of sensors, which may be in communication with the simulation environment. Recording the technique of the user may facilitate a simulation or may allow the user to review the recorded information. Some examples of sensors used to record the techniques of the user are cameras and object tracking devices. As a first non-limiting example, a camera may be used to record a swinging technique of the user, which allows the user or a coach to review the swinging technique. As a second non-limiting example, an object tracking device in a golf simulation environment may be used to calculate speed, spin, and direction of a golf ball hit by the user.

Typically, simulation environments employ a range of display sizes to relay the simulation to the user. Projection style displays are very commonly used in simulation environments, for their cost effectiveness in creating an immersive environment for the user. Projection style displays, however, are ineffective and create a poor immersive environment when excessive lighting is present, which is required for proper operation of cameras operating at certain shutter speeds. Projection style displays are best suited for low light environments. Consequently, simulation environments using projection style displays are low light environments. Similarly, other types of displays, such as backlit displays, may also be ineffective and create a poor immersive environment when excessive lighting is present.

Such low light environments may reduce the usefulness of a simulation environment used for sports. Conventional participation in many sports typically occurs in adequately-lit environments, such as outdoors. A low light environment may inhibit a camera forming a portion of the simulation environment from operating effectively. Further, the low light environment may inhibit the user from obtaining the advantages sought through use of the simulation environment. Conversely, however, an amount of light needed to effectively operate the camera forming a portion of the simulation environment may result in user discomfort and may discourage communication between the user and a coach.

It would be advantageous to develop a system for adjusting a lighting setting used with sport simulation equipment that facilitates proper operation of a camera during a simulation, properly illuminates a simulation environment for a user, and minimally interferes with an operation of a display during the simulation.

SUMMARY OF THE INVENTION

Presently provided by the invention, a system for adjusting a lighting setting used with sport simulation equipment that facilitates proper operation of a camera during a simulation, properly illuminates a simulation environment for a user, and minimally interferes with an operation of a display during the simulation, has surprisingly been discovered.

In one embodiment, the present invention is directed to a light dimmer for use with golf simulation equipment. The light dimmer comprises a data interface, a light controller, an operations processor, and a storage device. The data interface is in communication with the golf simulation equipment. The light controller is in communication with at least one light source. The operations processor is in communication with the data interface and the light controller. The storage device is in data communication with the operations processor. The storage device includes at least one lighting profile. In response to communication between the golf simulation equipment and the data interface, the operations processor accesses the at least one lighting profile on the storage device and adjusts a state of operation of the at least one light source using the light controller.

In another embodiment, the present invention is directed to a light adjusting system for use with sport simulation equipment. The light adjusting system comprises a data interface, a light controller, an operations processor, and a storage device. The data interface is in communication with the sport simulation equipment. The light controller is in communication with at least one light source. The operations processor is in communication with the data interface and the light controller. The storage device is in data communication with the operations processor. The storage device includes at least one lighting profile. In response to communication between the sport simulation equipment and the data interface, the operations processor accesses the at least one lighting profile on the storage device and adjusts a state of operation of the at least one light source using the light controller.

In yet another embodiment, the present invention is directed to a method of adjusting a state of operation of at least one light source used with golf simulation equipment. The method comprises the steps of providing the golf simulation equipment, providing the at least one light source, providing a light dimmer, communicating a signal from the golf simulation equipment to a data interface of the light dimmer, accessing at least one lighting profile on a storage device with an operations processor in response to the signal from the golf simulation equipment, and adjusting a state of operation of the at least one light source using a light controller in response to the signal from the golf simulation equipment. The light dimmer comprises the data interface in communication with the golf simulation equipment, the light controller in communication with the at least one light source, the operations processor in communication with the data interface and the light controller, and the storage device in data communication with the operations processor. The storage device includes at least one lighting profile.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
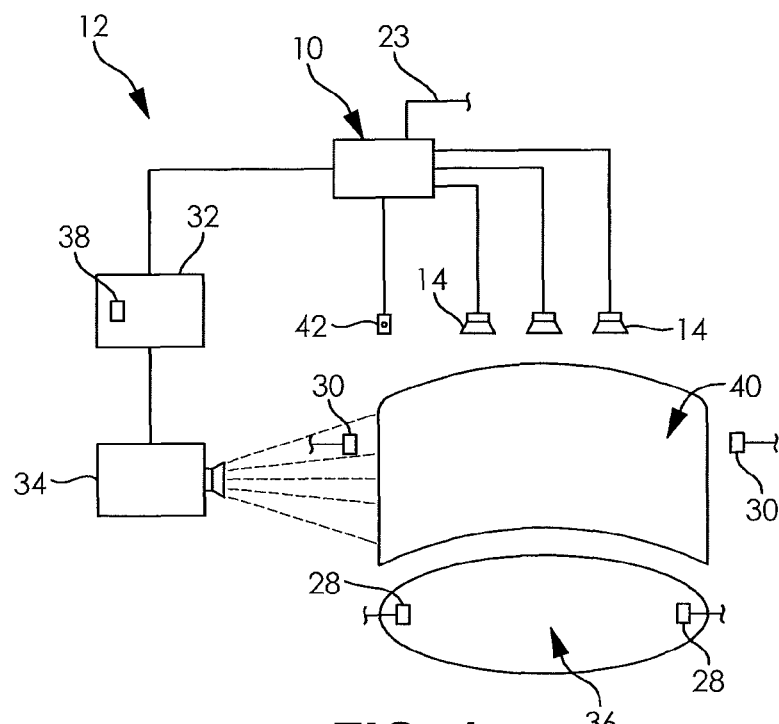
FIG. 1 is a schematic illustration of a light adjusting system in communication with an arrangement of sport simulation equipment.

FIG. 1 illustrates a light adjusting system 10 and an arrangement of sport simulation equipment 12. The light adjusting system 10 is in communication with the sport simulation equipment 12 and a plurality of light sources 14. In response to actions performed by the sport simulation equipment 12, the light adjusting system 10 places the plurality of light sources 14 in one of at least two lighting settings. The light adjusting system 10 may be commonly referred to as a light dimmer; however, it is understood that the light adjusting system 10 includes many additional features which are described herein below.

Figure 2:
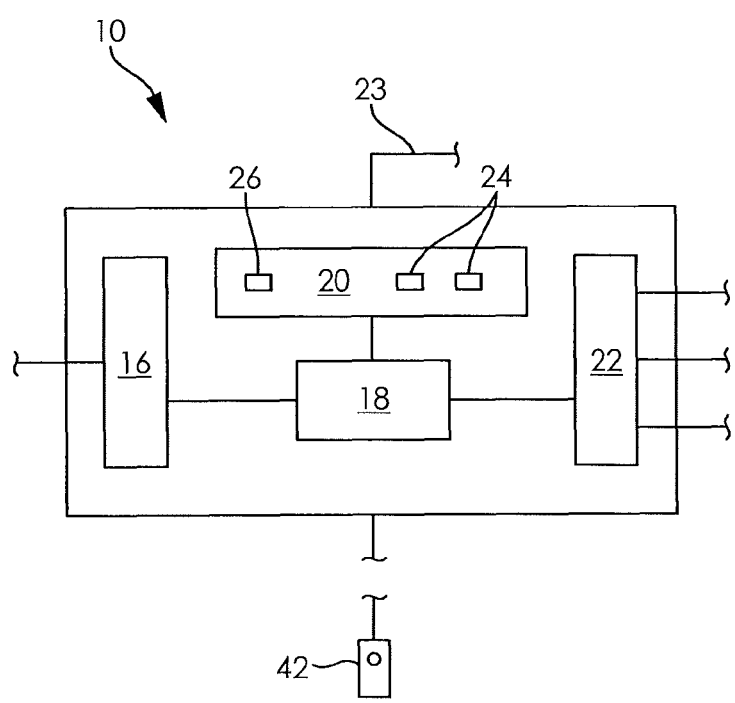
FIG. 2 is a schematic illustration of the light adjusting system shown in FIG. 1, the light adjusting system including a data interface, an operations processor, a storage device, and a light controller.

FIGS. 1 and 2 illustrate the light adjusting system 10. The light adjusting system 10 is in communication with the sport simulation equipment 12 and the plurality of light sources 14. The light adjusting system 10 comprises a data interface 16, an operations processor 18, a storage device 20, and a light controller 22. The light adjusting system 10 is in communication with the sport simulation equipment 12 via the data interface 16. The light adjusting system 10 is in electrical communication with the plurality of light sources 14 via the light controller 22. The operations processor 18 is in data communication with the data interface 16, the storage device 20, and the light controller 22. It is understood that in embodiments of the invention not shown that the light adjusting system 10 may form a portion of the sport simulation equipment 12 and that the operations processor 18 and storage device 20 may be used by the sport simulation equipment 12 for performing a plurality of tasks. In embodiments of the invention where the light adjusting system 10 forms a portion of the sport simulation equipment 12, it is understood that the data interface 16 may not be required. Additionally, it is understood that the light adjusting system 10 may be configured with a timing output 23 that transmits information regarding a state of operation of the light adjusting system 10. As a non-limiting example, the timing output 23 may transmit information regarding a timing associated with a state of operation of the light controller 22. The timing output 23 may be in communication with additional light sources such as strobe style lighting, at least one camera, other equipment that may be automated, or specialized equipment for use with the sport simulation equipment 12.

The data interface 16 is a portion of the light adjusting system 10 that facilitates data communication between the sport simulation equipment 12 and the operations processor 18. In one embodiment of the invention, the data interface 16 is configured to accept a signal from the sport simulation equipment 12 indicating that the sport simulation equipment 12 is in one of an armed condition and a display condition. The signal from the sport simulation equipment 12 may be an analog signal or a digital signal, and may relay additional information regarding an operational condition of the sport simulation equipment 12 to the operations processor 18.

The operations processor 18 is a computing device forming a portion of the light adjusting system 10. The operations processor 18 executes a series of instructions in response to the signal from the sport simulation equipment 12. In response to the signal from the sport simulation equipment 12, the operations processor 18 may access information on the storage device 20, change information on the storage device 20, and adjust a signal supplied to the light controller 22. It is understood that a series of instructions executed by the operations processor 18 may be stored on a chip forming a portion of the operations processor 18, may be stored on the storage device 20, or may be stored on both the operations processor 18 and the storage device 20. Further, in embodiments of the invention not shown, the operations processor 18 may be in communication with a user input device (not shown), which also forms a portion of the light adjusting system 10.

The storage device 20 is in communication with the operations processor 18. The storage device 20 may be a hard drive, a flash memory chip, or another form of computer memory. As mentioned hereinabove, the operations processor 18 may access information on the storage device 20 or change information on the storage device 20. Information stored on the storage device 20 may include a plurality of lighting profiles 24 or a series of instructions 26 to be executed by the operations processor 18.

The light controller 22 is a portion of the light adjusting system 10 that facilitates electrical communication between each of the plurality of light sources 14 and the operations processor 18. In one embodiment of the invention, the light controller 22 comprises a pulse width modulating circuit configured to accept a signal from the operations processor 18 based on one of the lighting profiles 24 or a transitionary phase between two of the lighting profiles 24; however, it is understood that other circuit types, such as a circuit including a silicon-controlled rectifier or a circuit including a triode for alternating current, for example, may be used. While not illustrated in FIG. 2, it is understood that the light controller 22 may be connected to a power supply (not shown) which is modulated by the light controller 22 before being applied to each of the plurality of light sources 14. It is understood that the light controller 22 may be configured to control each of the plurality of light sources 14 in an independent manner based on the signal received from the operations processor 18.

FIG. 1 illustrates the sport simulation equipment 12. The sport simulation equipment 12 comprises a plurality of user tracking devices 28, a plurality of object tracking devices 30, a processor 32, and a projector 34. The plurality of user tracking devices 28, the plurality of object tracking devices 30, and the projector 34 are in communication with the processor 32. It is understood that any number of user tracking devices, object tracking devices, projectors, and processors may be used. It is further understood that any specific positioning of the user tracking devices 28, the object tracking devices 30, the projector 34 and other equipment is not limited by the arrangement illustrated in FIG. 1. Other configurations and relative positioning can be used. As a non-limiting example, the sport simulation equipment 12 may be golf simulation equipment, which may be commonly referred to as a golf simulator.

Each of the user tracking devices 28 is a tracking camera in communication with the processor 32. The user tracking devices 28 are positioned such that a collective field of view of the user tracking devices 28 covers a pre-defined field of activity 36 where user activity generally occurs. However, it is understood that any other means of tracking a position of the user may be used, such as an accelerometer/gyroscopic system, a transponder system, a sonic/sonar system, and structured light/machine vision techniques known in the art, such as marked attire (e.g. light emitting diode markers) or projected grid or line patterns, for example. In certain embodiments, the user wears an object such as a hat with one or more markers (e.g. dots or other shape or pattern). As such, the markers are detected by the user tracking devices 28 as the user enters the field of activity 36 and tracked as the user moves within a field of vision of the user tracking devices 28.

The object tracking devices 30 are positioned to track a motion of any object such as sports implements used in golf, tennis, and baseball for example. The object tracking devices 30 are typically high speed cameras for tracking at least a speed, a direction, and a spin of a moving object. As a non-limiting example, the object tracking devices 30 are similar to the 3Trak® high-speed photography technology used in simulators manufactured by aboutGolf Ltd. of Maumee, Ohio. However, other object tracking devices can be used, as appreciated by one skilled in the art.

The processor 32 is in data communication with the user tracking devices 28 for receiving a sensor signal therefrom, analyzing the sensor signal, and generating the image signal in response to the analysis of the sensor signal. As a non-limiting example, the processor 32 analyzes the sensor signal based upon an instruction set 38. The instruction set 38, which may be embodied within any computer readable medium, includes processor executable instructions for configuring the processor 32 to perform a variety of tasks and calculations. As a non-limiting example the instruction set 38 includes processor executable algorithms and commands relating to image processing, spatial representation, geometrical analysis, three-dimensional physics, and a rendering of digital graphics. It is understood that any equations can be used to model the position of at least a portion of the user, it is further understood that the processor 32 may execute a variety of functions such as controlling various settings of the user tracking devices 28, the object tracking devices 30, and the projector 34, for example, in certain embodiments, the processor 32 includes a software suite for tracking a movement and trajectory of an object in the field of activity 36.

The projector 34 is positioned to project an image onto a display screen 40. It is understood that a plurality of projectors may be used to provide a panoramic or a surrounding image. The projector 34 is adapted to receive an image signal from the processor 32 to create and modify the image projected on the display screen 40. It is understood that other displays can be used to generate an image based upon the image signal. In embodiments of the invention not shown, it is understood that the projector 34 and the display screen 40 may be replaced by a backlit style display.

The display screen 40 is positioned to receive an image from the projector 34. The display screen 40 is typically formed from a substantially smooth material and positioned to create a substantially flat resilient surface for withstanding an impact and absorbing the energy of a moving sports object (e.g. a golf ball or a baseball); however, it is understood that a plurality of the projectors 30 may be used to provide a panoramic or a surrounding image.

The plurality of light sources 14 may be any device or system for illuminating at least a portion of the field of activity 36. Each of the plurality of light sources 14 is in electrical communication with the light controller 22 of the light adjusting system 10. Each of the plurality of light sources 14 may provide one of direct lighting and ambient lighting, and the plurality of light source 14 may be dispersed at a variety of locations and orientations within the field of activity 36. The plurality of light sources 14 are arranged to illuminate at least one of the user and the field of activity 36 in a manner that facilitates operation of the user tracking devices 28, and facilitates operation of a high speed camera (not shown), which may be at least one of the user tracking devices 28. It is understood that in certain embodiments, the user tracking devices 28 may require a particular light source to provide reliable tracking of the position of the user. It is further understood, that the light sources 14 may provide aesthetic features to further enhance a simulated experience for the user. The plurality of light sources 14 may be placed in a state of operation by the light controller 22 in response to a signal from the operations processor 18 based on one of the lighting profiles 24. Further, it is understood that the transitionary phase between two of the lighting profiles 24 the light controller 22 is placed in by the operations processor 18 is reflected in a state of operation of the plurality of light sources 14.

Further, the light adjusting system 10 or the sport simulation equipment 12 may be in communication with at least one light meter 42. The at least one light meter 42 facilitates an automated optimization of a state of operation of the plurality of light sources 14 by the light controller 22. The at least one light meter 42 is in communication with one of a portion of the light adjusting system 10 to facilitate the automated optimization of a state of operation of the plurality of light sources 14 based on a portion of the series of instructions 26. In embodiments of the invention not shown, the at least one light meter 42 may be in communication with the sport simulation equipment 12 to facilitate the automated optimization of a state of operation of the plurality of light sources 14 based on a portion of the instruction set 38. The at least one light meter 42 may be positioned within the field of activity 36 to optimize the automated optimization of a state of operation of the plurality of light sources 14. Further, it is understood that based on information from the at least one light meter 42, at least one of the plurality of lighting profiles 24 may be modified.

In use, the light adjusting system 10 cooperates with the sport simulation equipment 12 to operate the plurality of light sources 14 in an automated manner based on at least one lighting profile 24, which may be selected by the user. Further, the light adjusting system 10 facilitates placing the plurality of light sources 14 in a state of operation based on an operational condition of the sport simulation equipment 12. Control of an intensity level and a timing of each of the plurality of light sources 14 using the light adjusting system 10 improves a user experience with the sport simulation equipment 12 while creating a lighting environment that facilitates operation of the plurality of user tracking devices 28 or the high speed camera. Each of the states of operation of the plurality of light sources 14 may be referred to as a lighting preset. Further, it is understood that the light adjusting system 10 facilitates a transitionary phase between two of the lighting presets based on the operational condition of the sport simulation equipment 12. However, it is understood that the light adjusting system 10 is capable of placing the plurality of light sources 14 into a plurality of lighting presets.

Each of the lighting presets that the plurality of light sources 14 may be operated in corresponds to one of the lighting profiles 24 stored on the storage device 20 of the light adjusting system 10. The light adjusting system 10 includes at least two lighting profiles 24. Each of the lighting profiles 24 and an associated lighting preset facilitate use of the sport simulation equipment 12 and may be based on the operational condition of the sport simulation equipment 12, may be based on a preference of the user, or may be based on an operational condition of equipment not shown in FIG. 1. Selection of one of the lighting profiles 24 may also be based on an occurrence of a condition or an absence of a condition, which is detected by the light adjusting system 10. Further, it is understood that one of the lighting profiles 24 may be selected based on an occurrence or an absence of a plurality of conditions. The lighting profiles 24 may be adjusted by the user of the light adjusting system 10 or the user of the light adjusting system 10 may create additional lighting profiles.

As a first non-limiting example, one of the lighting profiles 24 results in a lighting preset which illuminates the field of activity 36 and the user in a manner that facilitates at least one of participation by the user of the sport simulation equipment 12, facilitates operation of the user tracking devices 28, and facilitates operation of the high speed camera, which may be at least one of the user tracking devices 28. Such a lighting profile may be referred to as an illumination profile. The user may adjust the illumination profile through an interface (not shown) of the light adjusting system 10 or through an interface (not shown) of the sport simulation equipment 12 via the data interface of the light adjusting system 10. Further, it is understood that the illumination profile may be adjusted or automatically created based upon a detection of a plurality of conditions by the light adjusting system 10. Because the light controller 22 may be configured to control each of the plurality of light sources 14 in an independent manner based on the signal received from the operations processor 18, the user may adjust the illumination profile to facilitate operation of the user tracking devices 28 in a very accurate manner. It is also understood that the interface of the light adjusting system 10 or the interface of the sport simulation equipment 12 may be configured to simplify user interaction, such as through selection of one of the lighting profiles 24 based on a handedness of the user.

As a second non-limiting example, one of the lighting profiles 24 results in a lighting preset which does not or merely partially illuminates the field of activity 36 in a manner that facilitates observation of the display screen 40 by the user or facilitates communication between the user and a coach. Such a lighting profile may be referred to as an observation profile. The user may adjust the observation profile through the interface of the light adjusting system 10 or through the interface of the sport simulation equipment 12 via the data interface of the light adjusting system 10. Further, it is understood that the observation profile may be adjusted or automatically created based upon a detection of a plurality of conditions by the light adjusting system 10.

When operation of the sport simulation equipment 12 is desired by the user to perform a sport simulation, the user (or an assistant to the user) initiates the sport simulation through the interface of the sport simulation equipment 12. As a non-limiting example, the user may initiate the sport simulation using a computer in data communication with the sport simulation equipment 12. Upon initiation of the sport simulation, the processor 32 may communicate with the light adjusting system 10 to initiate an adjustment of at least one of the lighting profiles 24 and place the sport simulation equipment 12 in a standby mode based on the instruction set 38.

When the sport simulation equipment 12 is placed in the standby mode, the processor 32 communicates with the light adjusting system 10 to place the plurality of light sources 14 in the observation profile, which facilitates the user in observing the display screen 40. It is understood that based on the observation profile, which may be modified by the user, the light adjusting system 10 may not need to adjust the operational state of the plurality of light sources 14 when initially placed in the standby mode. Further, when the sport simulation equipment 12 is placed in the standby mode, the processor 32 seeks identification of a condition by analyzing data from the plurality of user tracking devices 28 and the plurality of object tracking devices 30. Upon recognition of such a condition, the processor 32 places the sport simulation equipment 12 in an armed mode.

As non-limiting examples of conditions which the processor 32 may identify which prompt placing the sport simulation equipment 12 in the armed mode from the standby mode are detection of the user within the field of activity 36, detection of a particular user or a characteristic of the user within the field of activity 36, detection of a ball (not shown) within the field of activity 36, detection of a ball (not shown) in a non-moving state within the field of activity 36, or detection of a sports instrument (not shown), such as a golf club, within the field of activity 36. Further, it is understood that any one detection or any combination of detections may prompt placing the sport simulation equipment 12 in the armed mode. Further, it is understood that selection of one of the lighting profiles 24 based on a handedness of the user may be identified based on conditions recognized by the processor 32.

Once placed in the armed mode, the processor 32 may perform a plurality of tasks based on the instruction set 38. The processor 32 may change a manner of seeking identification of a condition by analyzing data from the plurality of user tracking devices 28 and the plurality of object tracking devices 30. As a non-limiting example, the processor may switch from the detection of the user within the field of activity 36 to the detection and a tracking of the ball within the field of activity 36. The processor 32 may also initiate a recording of the user using at least one of the user tracking devices 28 or the high speed camera. Further, the processor 32 communicates with the light adjusting system 10 to initiate an adjustment from the observation profile to the illumination profile.

The light adjusting system 10 adjusts from the observation profile to the illumination profile using the transitionary phase. Such an adjustment may begin with the operations processor 18 accessing at least one of the lighting profiles 24 on the storage device 20. Through communication with the light controller 22, the operations processor 18 adjusts the plurality of light sources 14. The transitionary phase between the observation profile and the illumination profile may be based on a portion of the series of instructions 26 stored on the storage device, which are executed by the operations processor 18. The portion of the series of instructions 26 which allows the light adjusting system 10 to perform the transitionary phase between lighting profiles 24 may describe a linear or non-linear transition between lighting profiles 24, may describe implementing the transitionary phase over a predetermined amount of time based on at least one of the observation profile and the illumination profile, and may describe implementing the transitionary phase in a manner based on at least one the observation profile and the illumination profile. Further, it is understood that the series of instructions 26 which allows the light adjusting system 10 to perform the transitionary phase may implement the transitionary phase in a manner that facilitates adaptation of the eyes of the user to the illumination profile. As mentioned hereinabove, the illumination profile facilitates at least one of participation by the user of the sport simulation equipment 12, facilitates operation of the user tracking devices 28, and facilitates operation of a high speed camera (not shown), which may be at least one of the user tracking devices 28.

Next, the processor 32 seeks identification of a condition by analyzing data from the plurality of user tracking devices 28 and the plurality of object tracking devices 30 that prompt placing the sport simulation equipment 12 in a display mode from the armed mode. Upon recognition of such a condition, the processor 32 places the sport simulation equipment 12 in the display mode. As a non-limiting example of a condition which the processor may identify which prompts placing the sport simulation equipment 12 in the display mode from the armed mode is detection of the user hitting the ball within the field of activity 36.

Once placed in the display mode, the processor 32 may perform a plurality of tasks based on the instruction set 38. The processor 32 generates a simulation which is displayed on the display screen 40 using the projector 34. The simulation is generated by the processor 32 by analyzing data from the plurality of object tracking devices 30 following detection of the user hitting the ball within the field of activity 36. Further, the processor 32 communicates with the light adjusting system 10 to initiate an adjustment from the illumination profile to the observation profile.

The light adjusting system 10 adjusts from the illumination profile to the observation profile using the transitionary phase. Such an adjustment may begin with the operations processor 18 accessing at least one of the lighting profiles 24 on the storage device 20. Through communication with the light controller 22, the operations processor 18 adjusts the plurality of light sources 14. The transitionary phase between the illumination profile and the observation profile may be based on a portion of the series of instructions 26 stored on the storage device, which are executed by the operations processor 18. The portion of the series of instructions 26 which allows the light adjusting system 10 to perform the transitionary phase between lighting profiles 24 may describe a linear or non-linear transition between lighting profiles 24, may describe implementing the transitionary phase over a predetermined amount of time based on at least one of the observation profile and the illumination profile, and may describe implementing the transitionary phase in a manner based on at least one the observation profile and the illumination profile. Further, it is understood that the series of instructions 26 which allows the light adjusting system 10 to perform the transitionary phase may implement the transitionary phase in a manner that facilitates adaptation of the eyes of the user to the observation profile. As mentioned hereinabove, the observation profile facilitates observation of the display screen 40 by the user by not or merely partially illuminating the field of activity 36.

After a predetermined amount of time or after an action of the user, the processor 32 places the sport simulation equipment 12 in the standby mode from the display mode. As mentioned hereinabove, when the sport simulation equipment 12 is placed in the standby mode, the processor 32 communicates with the light adjusting system 10 to place the plurality of light sources 14 in the observation profile. Because the light adjusting system 10 was previously adjusted to the observation profile during the display mode, no further action is required by the light adjusting system 10 when the processor 32 places the sport simulation equipment 12 in the standby mode. Following a return to the standby mode, the sport simulation equipment 12 may be operated again in the manner described above.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A golf simulator comprising:
   at least one of a user tracking device and an object tracking device;
   a golf simulator processor in communication with the at least one of the user tracking device and the object tracking device; and
   a light dimmer in communication with the golf simulator processor, the light dimmer comprising:
   a data interface in communication with the golf simulator;
   a light controller in communication with at least one light source;
   an operations processor in communication with the data interface and the light controller; and
   a storage device in data communication with the operations processor, the storage device including at least one lighting profile, wherein in response to communication between the golf simulator processor and the data interface, the operations processor accesses the at least one lighting profile on the storage device and adjusts a state of operation of the at least one light source using the light controller, based on an identification of a condition by the golf simulator processor performed by analyzing data from the at least one of the user tracking device and the object tracking device.

2. The golf simulator according to claim 1, wherein the light controller comprises a pulse width modulating circuit.

3. The golf simulator according to claim 1, wherein the light controller comprises a circuit including a silicon-controlled rectifier.

4. The golf simulator according to claim 1, wherein the light controller comprises a circuit including a triode for alternating current.

5. The golf simulator according to claim 1, further comprising a light meter in communication with a portion of the light dimmer.

6. The golf simulator according to claim 1, further comprising a timing output that transmits information regarding a state of operation of the light dimmer.

7. A sports simulator comprising:
   at least one of a user tracking device and an object tracking device;
   a sports simulator processor in communication with the at least one of the user tracking device and the object tracking device; and
   a light dimmer in communication with the sports simulator processor, the light dimmer comprising:
   a data interface in communication with the sports simulator;

a light controller in communication with at least one light source;

an operations processor in communication with the data interface and the light controller; and a storage device in data communication with the operations processor, the storage device including at least one lighting profile, wherein in response to communication between the sports simulator processor and the data interface, the operations processor accesses the at least one lighting profile on the storage device and adjusts a state of operation of the at least one light source using the light controller, based on an identification of a condition by the sports simulator processor performed by analyzing data from the at least one of the user tracking device and the object tracking device.

8. The sports simulator according to claim 7, wherein the light controller comprises a pulse width modulating circuit.

9. The sports simulator according to claim 7, wherein the light controller comprises a circuit including a silicon-controlled rectifier.

10. The sports simulator according to claim 7, wherein the light controller comprises a circuit including a triode for alternating current.

11. The sports simulator according to claim 7, further comprising a light meter in communication with a portion of the light adjusting system.

12. The sports simulator according to claim 7, further comprising a timing output that transmits information regarding a state of operation of the light adjusting system.

13. A method of adjusting a state of operation of at least one light source used with golf simulation equipment, the steps of the method comprising:

providing the golf simulation equipment comprising at least one of a user tracking device and an object tracking device and a golf simulator processor in communication with the at least one of the user tracking device and the object tracking device;

providing the at least one light source;

providing a light dimmer in communication with the golf simulator processor, the light dimmer comprising a data interface in communication with the golf simulation equipment, a light controller in communication with the at least one light source, an operations processor in communication with the data interface and the light controller, and a storage device in data communication with the operations processor, the storage device including at least one lighting profile;

communicating a signal from the golf simulation equipment to the data interface of the light dimmer;

accessing the at least one lighting profile on the storage device with the operations processor in response to the signal from the golf simulation equipment; and adjusting a state of operation of the at least one light source using the light controller in response to the signal from the golf simulation equipment, the signal based on an identification of a condition by the golf simulator processor performed by analyzing data from the at least one of the user tracking device and the object tracking device.

14. The method of adjusting a state of operation of at least one light source used with golf simulation equipment according to claim 13, wherein the step of adjusting a state of operation of the at least one light source using the light controller in response to the signal from the golf simulation equipment is performed using a transitionary phase.

15. The method of adjusting a state of operation of at least one light source used with golf simulation equipment according to claim 13, wherein the storage device includes at least an observation profile and an illumination profile.

16. The method of adjusting a state of operation of at least one light source used with golf simulation equipment according to claim 13, wherein the light dimmer further comprises a light meter in communication with a portion of the light dimmer.

17. The method of adjusting a state of operation of at least one light source used with golf simulation equipment according to claim 13, wherein the light dimmer further comprises a timing output that transmits information regarding a state of operation of the light dimmer.

18. The method of adjusting a state of operation of at least one light source used with golf simulation equipment according to claim 13, wherein the at least one lighting profile may be based on an operational condition of the sport simulation equipment.

19. The method of adjusting a state of operation of at least one light source used with golf simulation equipment according to claim 13, wherein the at least one lighting profile may be based on a preference of a user of the golf simulation equipment and the at least one lighting profile may be adjusted by the user of the golf simulation equipment.

20. The method of adjusting a state of operation of at least one light source used with golf simulation equipment according to claim 13, wherein the step of adjusting a state of operation of the at least one light source using the light controller is based on a series of instructions stored on one of the operations processor and the storage device.

21. The method of adjusting a state of operation of at least one light source used with golf simulation equipment according to claim 13, wherein the condition identified by the golf simulator processor by analyzing data from the at least one of the user tracking device and the object tracking device is detection of a ball within a field of activity.

22. The method of adjusting a state of operation of at least one light source used with golf simulation equipment according to claim 13, wherein the condition identified by the golf simulator processor by analyzing data from the at least one of the user tracking device and the object tracking device is detection of a user of the golf simulation equipment hitting a ball within the field of activity.

23. The method of adjusting a state of operation of at least one light source used with golf simulation equipment according to claim 14, wherein the signal from the golf simulation equipment is a signal indicating detection of a user of the golf simulation equipment hitting a ball within the field of activity.

* * * * *